United States Patent [19]

Reznick et al.

[11] 4,448,354

[45] May 15, 1984

[54] AXISYMMETRIC THRUST AUGMENTING EJECTOR WITH DISCRETE PRIMARY AIR SLOT NOZZLES

[75] Inventors: Steven G. Reznick; Milton E. Franke, both of Dayton, Ohio

[73] Assignee: The United States of America as represented by the Secretary of the Air Force, Washington, D.C.

[21] Appl. No.: 401,163

[22] Filed: Jul. 23, 1982

[51] Int. Cl.³ ............................................. B64C 15/00
[52] U.S. Cl. ......................... 239/265.17; 239/DIG. 7; 417/197
[58] Field of Search ................... 239/DIG. 7, 265.11, 239/265.17; 417/196, 197

[56] References Cited

U.S. PATENT DOCUMENTS

| | | | |
|---|---|---|---|
| 749,050 | 1/1904 | Fraser. | |
| 2,000,762 | 5/1935 | Kraft | 103/267 |
| 3,216,653 | 11/1965 | LeNabour | 417/197 |
| 3,525,474 | 8/1970 | von Ohain et al. | 239/265.17 |
| 3,694,107 | 9/1972 | Stein | 417/167 |
| 3,739,984 | 6/1973 | Tontini | 239/265.17 |
| 3,795,367 | 3/1974 | Mocarski | 239/265.17 |
| 4,046,492 | 9/1977 | Inglis | 417/197 |
| 4,192,461 | 3/1980 | Arborg | 239/265.17 |
| 4,196,585 | 4/1980 | Svischev et al. | 239/265.17 |

OTHER PUBLICATIONS

Paul M. Bevilaqua, "Lifting Surface Theory for Thrust-Augmenting Ejectors", *AIAA Journal*, vol. 16, No. 5, May 1978, pp. 475–581.

Theodore von Karman, "Theoretical Remarks on Thrust Augmentation", 1949, pp. 461–468.

Paul M. Bevilaqua, "Evaluation of Hypermixing for Thrust Augmenting Ejectors" *J. of Aircraft*, vol. 11, No. 6, Jun. 1974, pp. 348–354.

Paul M. Bevilaqua, "Analytic Description of Hypermixing and Test of an Improved Nozzle" *J. of Aircraft*, vol. 13, No. 1, Jan. 1, 1976, pp. 43–48.

*Primary Examiner*—John J. Love
*Assistant Examiner*—Michael J. Forman
*Attorney, Agent, or Firm*—Donald J. Singer; John R. Flanagan

[57] ABSTRACT

A circular thrust augmenting ejector has an annular wall which defines a central passageway and a convergent contoured inlet section, a constant area cylindrical mixing section and a divergent conical diffuser outlet section. The inlet, mixing and outlet sections merge one into the next in axisymmetric serial relationship. The ejector also has a plurality of discrete primary nozzles arranged about the periphery of the annular wall at the entrance to the inlet section thereof for injecting a primary flow of high velocity air into the inlet section and thereby entraining a secondary flow of ambient air into the central passageway of the ejector.

8 Claims, 3 Drawing Figures

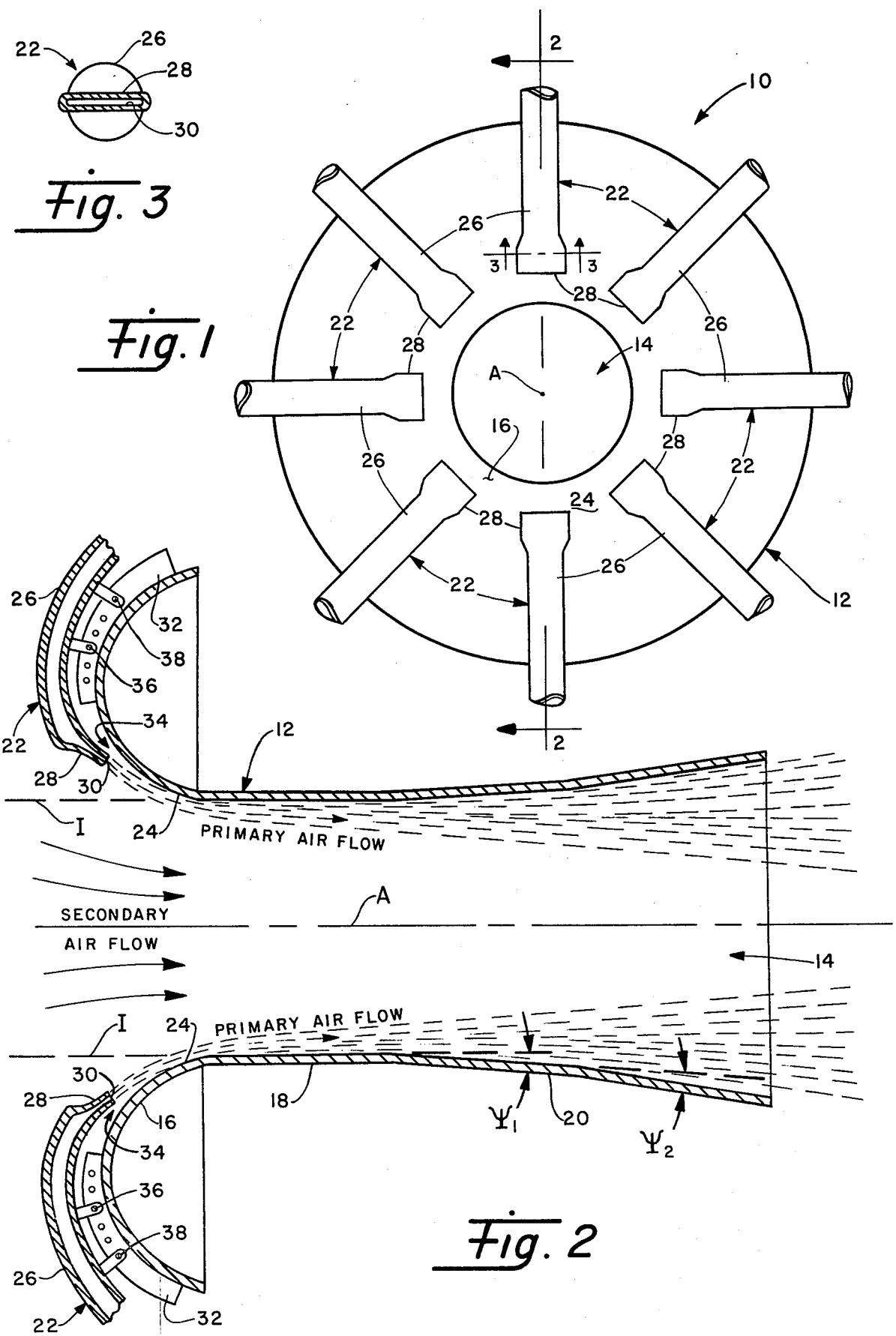

1

AXISYMMETRIC THRUST AUGMENTING EJECTOR WITH DISCRETE PRIMARY AIR SLOT NOZZLES

RIGHTS OF THE GOVERNMENT

The invention described herein may be manufactured and used by or for the Government of the United States for all governmental purposes without the payment of any royalty.

BACKGROUND OF IHE INVENTION

1. Field of the Invention

The present invention broadly relates to ejectors for augmentation of thrust and more particularly, is concerned with an axisymmetric ejector configuration which, by using discrete primary air slot nozzles, achieves high thrust augmentation ratios.

2. Description of the Prior Art

The need to improve the effectiveness of thrust generation for vectored thrust VTOL (Vertical Takeoff and Landing) and STOL (Short Takeoff and Landing) aircraft during the takeoff, transition and landing phases of flight has been a recurring problem in the performance of these aircraft. Enormous thrust requirements during these three flight phases have mandated oversized engines which have detracted from cruise performance, and have severely limited payload capability due to excess engine and ducting weight.

The use of a thrust augmenting ejector, integrated into an effective aircraft system, has been considered as a possible solution to this problem. Specifically, additional thrust required for vertical or very short takeoff and landing of an aircraft is generated by diverting a portion of its jet engine exhaust through the thrust augmenting ejector. For this reason, the development of thrust augmenting ejectors (hereinafter referred to simply as ejectors) has been aggressively pursued since their potential was first suggested by Theodore von Karman in his classic paper on the subject in 1949 (see "Theoretical Remarks on Thrust Augmentation," *Contributions to Applied Mechanics, Reissner Anniversary Vblume*, J. W. Edwards, Ann Arbor, MI, 1949, pp. 461–468). Both theoretical and experimental development of ejectors have been described by Paul M. Bevilaqua in a series of publications (see "Evaluation of Hypermixing for Thrust Augmenting Ejectors," *Journal of Aircraft*, Vol. 11, No. 6, June 1974, pp. 348-354; "Analytic Description of Hypermixing and Test of an Improved Nozzle," *Journal of Aircraft*, Vol. 13, No. 1, January 1976, pp. 43–48; and "Lifting Surface Theory for Thrust-Augmenting Ejectors," *AIAA Journal*, Vol. 16, No. 5, May 1978, pp. 475–581).

The basic conventional ejector is comprised of a shroud or duct and a primary source of high velocity air or fluid aligned therewith. The duct has a contoured convergent inlet section, a constant area mixing section, and a divergent diffuser or outlet section. The primary source of fluid may be high velocity jets of compressed engine bleed air or engine exhaust which are injected into the duct. The high velocity flow of primary fluid entrains ambient secondary air or fluid by viscous shear forces or pressure interaction within the inlet section of the duct and discharges it downstream at the outlet section of the duct. Such secondary air entrainment achieves higher mass and thus higher momentum in the resultant combined primary and secondary fluid flow, which results in more thrust than would have been attained by the simple expansion of the engine exhaust to ambient conditions. The addition of the ejector allows reduction of the engine size by an amount equivalent to the extra thrust generated, after the weight penalty and ducting pressure losses of the added ejector hardware have been compensated for.

Ejector configurations are usually either rectangular (or two-dimensional) as exemplified by the ones illustrated and described in U.S. Pat. No. 3,525,474 to Hans J. P. von Ohain et al, or circular (or three-dimentional) for example as illustrated and described in U.S. Pat. No. 3,739,984 to Remo Tontini. While it is apparent that rectangular ejectors are readily adaptable for integration into an aircraft wing, certain disadvantages are implicit in the rectangular configuration. First, inlet and outlet losses are generated by the corners in rectangular ejectors. Second, flow separation losses often occur in the vicinity of end walls in the two-dimensional rectangular ejector.

These disadvantages of corners and end walls are not present in ejectors having circular configurations. However, very little development effort has apparently been directed toward determining an optimum circular ejector design. Consequently, in view of the general need to improve thrust generation in V/STOL-type aircraft, a particular need exists to design a circular ejector having improved thrust augmentation performance.

SUMMARY OF THE INVENTION

The present invention provides an axisymmetric thrust augmenting ejector designed to satisfy the aforementioned needs. The unique feature of the ejector is the provision of axisymmetric mixing and diffuser sections together with discrete primary slot nozzles at the inlet section. The type and location of the plurality of separate primary injection nozzles around the annular periphery of the inlet section advantageously allows a favorable flow distribution of air in the mixing and diffuser sections. The primary air flow is injected parallel to but not directly on the annular contoured surface of the inlet section. However, due to Coanda flow effect, the primary air is turned, or follows the contoured inlet section surface, into the mixing section, achieving high entrainment of secondary air while producing thrust and minimizing friction with the inlet surface. Corner losses and flow separation in the mixing and diffuser sections, as experienced in rectangular ejector configurations, are minimized in the circular ejector of the present invention by the unique axisymmetric design of both sections. Finally, the discrete nature and placement of the primary nozzles enhances mixing and improves performance, resulting in thrust augmentation ratios as high as two.

Accordingly, the present invention is directed to a circular thrust augmenting ejector having a contoured convergent inlet section, a constant area mixing section and a divergent conical diffuser outlet section. The inlet, mixing and outlet sections, interconnected in serial relationship, are symmetrically configured about a common central axis, or are axisymmetrical. The ejector also includes a plurality of discrete primary nozzles positioned along, but spaced from, the contoured or curved peripheral surface of the inlet section at the entrance thereto for injecting a primary flow of air into the ejector.

These primary air nozzles entrain secondary ambient air into the ejector. The combined flow proceeds through the ejector and discharges from the diffuser section. The flow configuration leads to a favorable velocity profile which reduces separation in the diffuser section.

Also, the primary nozzles are positioned so that primary flow leaves the nozzles generally parallel to the curved inlet section surface. Additionally, a gap is maintained between each peripheral nozzle and the inlet section surface. These features reduce friction on the ejector wall by the primary air flow. Further, the nozzles are spaced equidistant from one another around the periphery of the inlet section surface and are adjustable both relative to one another and along the inlet surface in defining a particular configuration for use.

BRIEF DESCRIPTION OF THE DRAWINGS

FIG. 1 is a front elevational view of a circular thrust augmenting ejector embodying the principles of the present invention.

FIG. 2 is a sectional view of the ejector taken along line 2—2 of FIG. 1.

FIG. 3 is an enlarged sectional view of one of the primary nozzles of the ejector taken along line 3—3 of FIG. 1.

DETAILED DESCRIPTION OF THE INVENTION

Referring now to the drawings, and more particularly to FIGS. 1 and 2, there is shown a circular thrust augmenting ejector, generally designated 10, embodying the preferred form of the present invention.

The ejector 10 is comprised of an annular wall, generally designated 12, which defines a central passageway 14 and has a convergent contoured inlet section 16, a constant area cylindrical mixing section 18, and a divergent conical diffuser outlet section 20. The inlet, mixing and outlet sections, which merge one into the next in serial relationship, are symmetrically configured about a common central axis A, or, in other works, are axisymmetrical in shape.

The ejector 10 also includes a plurality of discrete primary nozzles 22 positioned along, but spaced from, the contoured or curved peripheral surface 24 of the inlet section at the entrance thereto for injecting a primary flow of air at high velocity into the central passageway 14 defined by the ejector wall 12. It will be observed that the primary nozzles are located outside of an imaginary cylindrical extension I of the central passageway 14 upstream of the inlet section 16. The primary flow of air entrains a secondary ambient air flow into the inlet section 16 of the ejector 10. The combined flow of primary and secondary air then proceeds through the mixing and diffuser sections 18, 20.

Each of the primary nozzles, in the preferred embodiment of FIGS. 1 and 2, is formed by a curved, hook-like conduit 26 terminating in a flattened, elongated end 28 which defines a generally rectangular slot 30 (FIG. 3) through which the primary air is injected toward the ejector passageway 14. Primary air under elevated pressure is fed to the conduits 26 through a common supply line (not shown) from any suitable source (not shown). The flattened, elongated ends 28 of the primary nozzles 22 are positioned or aimed relative to the peripheral inlet section surface 24 so that primary air flow leaves the nozzle slot 30 generally parallel to the curved inlet section surface. Additionally, the nozzles 22 are suitably mounted on flanges 32, which extend in radial planes from the central axis A along the curved inlet section surface 24, such that a gap 34 is maintained between each nozzle end 28 and the inlet section surface 24. Furthermore, the nozzles 22 are spaced equidistant from one another around the inlet section surface 24, and are adjustable both relative to one another in a circumferential direction and along the inlet section surface in a radial direction. The nozzles can be pivoted at 36 to vary the size of the gap 34. The desired gap size is maintained by tightening set screws 38 so as to retain nozzles 22 at a desired pitch.

Therefore, the configuration of the nozzle slots 30 and the disposition of the nozzle ends 28 at the entrance to the inlet section 16 along the curved inlet section surface 24 advantageously allows a favorable mixing and flow distribution of primary and secondary air in the mixing and diffuser sections 18, 20. The primary air flow from the slots 30 in nozzle ends 28 is injected with a trajectory parallel to but not directly on the convergent contoured surface 24 of the inlet section 16.

However, due to Coanda flow effect, the primary flow is turned or follows the contoured surface 24, as depicted in FIG. 2, into the mixing section where the separate primary air flows (or jet-like streams) from the respective discrete nozzles 22 hypermix with adjacent primary and secondary ambient flows and at the same time entrain secondary air into the nozzle passageway 14. The spatial relationship of the nozzle ends 28 from the curved inlet section surface 24 and the achievement of Coanda flow attachment of the primary air flow from nozzle ends 28 onto the contoured surface 24 results in reduced pressure on the forward facing inlet surface 24, thereby producing thrust and reducing or minimizing friction by the primary air flow at the inlet surface. The discrete primary air injection slot-type nozzles 22 thereby increase air pumping efficiency in entraining the secondary air flow and turning the primary flow, and the secondary flow therewith, into the mixing section 18 through Coanda effect.

The circular ejector 10 of the present invention has been laboratory tested with resulting isentropic thrust augmentation ratios as high as 2.0. The basic laboratory approach was to test run the ejector on a low pressure (less than 100 psi) indoor static test stand under steady state conditions, and to record the measurements required to determine the isentropic thrust augmentation ratio. This index is the most widely used and generally accepted in the ejector study community. The ratio of primary to ambient pressure ranged from 1.1 to 1.5 for the low pressure test. The primary nozzle exit velocity was in all cases less than 450 fps (feet per second), and in the range of 300 fps for most of the testing. The average diffuser exit velocity was less than 70 fps with most velocities in the neighborhood of 50 fps.

The circular ejector tested was composed of a wooden inlet section and fiberglass mixing and diffuser sections. Its inlet section possessed a two inch radius of curvature followed by a constant area mixing section three inches long with a diameter of 4.4 inches. The ejector also had detachable parts making up the diffuser section which permitted two-stage diffusion at an angle $\psi_1$ from 3 to 6 degrees with respect to the central axis A, $\psi_2$ from 7 to 8 degrees with respect to $\psi_1$, with the possible addition of a 10 degree diffuser part with respect to $\psi_2$ as a third stage.

The hook-like nozzles were fabricated from copper and designed to provide single slot air flow tangent to the curved inlet section surface 24. The slot length was 0.94 inch and the slot gap (height) was 0.06 inch. The dimension of gap 34 was approximately 0.2 inch.

The circular ejector of the present invention achieved a favorable velocity profile which reduces flow separation in the diffuser section. There was a high velocity flow adjacent to the annular wall 12 of the ejector 10 with a relatively low velocity flow along the ejector centerline or central axis A. Based on these tests, one can conclude that the use of discrete nozzle 22 about the periphery of the inlet section entrance and the achievement of Coanda flow at the inlet section curved surface 24 gives a high thrust augmentation performance which compares favorably with the performance of other known ejectors. While the invention has not yet been integrated with actual aircraft propulsion systems, the ejector of the present invention has the potential to provide the necessary thrust performance for V/STOL-type aircraft in light of its high laboratory thrust performance. This high performance is significant considering the simplicity of the ejector design and its potential for higher performance with more development.

It is thought that the invention and many of its attendant advantages will be understood from the foregoing description and it will be apparent that various changes may be made in the form, construction and arrangement of the parts described without departing from the spirit and scope of the invention or sacrificing all of its material advantages, the form hereinbefore described being merely an exemplary embodiment thereof.

Having thus described the invention, what is claimed is:

1. A circular thrust augmenting ejector, comprising:
   (a) a contoured inlet section having a surface;
   (b) a constant area mixing section;
   (c) a conical diffuser outlet section;
   (d) said inlet, mixing and outlet sections merging one into the next in serial relationship, having a common central axis, and defining a central passageway; and
   (e) a plurality of discrete primary nozzles positioned at the entrance but spaced from the surface of said contoured inlet section for injecting a primary flow of high velocity air into said inlet section with a trajectory generally parallel thereto and thereby entraining a secondary flow of ambient air into said central passageway of said ejector.

2. The circular thrust augmenting ejector as recited in claim 1, wherein each of said primary nozzles is formed by a curved, hook-like conduit terminating in a flattened, elongated end which defines a rectangular slot through which the primary air is injected into said inlet section of said ejector.

3. The circular thrust augmenting ejector as recited in claim 2, wherein each of said primary nozzles is mounted relative to said inlet section such that a gap is maintained between each nozzle end and the curved surface of said inlet section.

4. The circular thrust augmenting ejector as recited in claim 3, wherein said nozzles are mounted for adjustment of their pitch so as to vary the size of the gap between each nozzle end and the curved surface of said inlet section.

5. The circular thrust augmenting ejector as recited in claim 1, wherein said nozzles are spaced equidistant from one another around said inlet section.

6. The circular thrust augmenting ejector as recited in claim 5, wherein said nozzles are mounted for adjustment both relative to one another in a circumferential direction and along said inlet section in a radial direction.

7. The circular thrust augmenting ejector as recited in claim 1, wherein said plurality of primary nozzles are located along said inlet section outside of an imaginary extension of said central passageway upstream of said inlet section.

8. A circular thrust augmenting ejector, comprising:
   (a) an annular wall which defines a central passageway, and a convergent inlet section, a cylindrical mixing section and a divergent outlet section in axisymmetric serial relationship; and
   (b) a plurality of discrete primary nozzles arranged about the periphery of said annular wall at the entrance to said inlet section thereof for injecting a primary flow of high velocity air into said inlet section with a trajectory generally parallel thereto which achieves Coanda flow attachment of the primary air onto said annular wall at said mixing section where the separate primary air flows from said respective discrete nozzles hypermix with adjacent primary and secondary ambient air flows and at the same time entrain secondary ambient air into said ejector passageway;
   (c) said plurality of primary nozzles being located along said annular wall at said inlet section thereof outside of an imaginary cylindrical extension of said central passageway upstream of said inlet section;
   (d) said each of said primary nozzles being formed by a curved, hook-like conduit terminating in a flattened, elongated end which defines a rectangular slot through which the primary air is injected into said inlet section of said ejector;
   (e) said each of said primary nozzles being mounted relative to said inlet section such that a gap is maintained between each nozzle end and said annular wall at said inlet section thereof.

* * * * *